United States Patent [19]

Gorman

[11] 4,424,473
[45] Jan. 3, 1984

[54] DRIVE APPARATUS FOR AN INDUSTRIAL ROBOT

[75] Inventor: Robert H. Gorman, Kernersville, N.C.

[73] Assignee: American Robot Corporation, Pittsburg, Pa.

[21] Appl. No.: 346,222

[22] Filed: Feb. 5, 1982

[51] Int. Cl.³ .................................................. G05B 19/42
[52] U.S. Cl. ...................................... 318/568; 318/8; 414/1
[58] Field of Search ................ 318/568, 8, 696; 414/1

[56] References Cited

U.S. PATENT DOCUMENTS

| | | |
|---|---|---|
| 1,667,718 | 5/1928 | Connell . |
| 1,720,018 | 7/1929 | Tubbs . |
| 2,417,198 | 3/1947 | Hindmarch . |
| 2,459,253 | 1/1949 | Tyrner .................................. 318/8 |
| 2,785,369 | 3/1957 | Ligh . |
| 3,146,386 | 8/1964 | Gerber .................................. 318/8 |
| 3,817,403 | 6/1974 | Glachet et al. . |
| 4,062,455 | 12/1977 | Flatau . |
| 4,289,996 | 9/1981 | Barnes et al. ........................ 318/8 X |
| 4,300,198 | 11/1981 | Davini ............................ 318/568 X |

FOREIGN PATENT DOCUMENTS 1180500  2/1970  United Kingdom ..................... 318/8

*Primary Examiner*—B. Dobeck
*Attorney, Agent, or Firm*—Bell, Seltzer, Park & Gibson

[57] ABSTRACT

An industrial robot is disclosed, which utilizes three like drive units for controlling movement about the three primary axes of rotation. Each drive unit comprises a pair of electrical stepping motors, which act through a differential gear train to control movement about the associated axis. Preferably, the number of teeth in the output drive gear of one motor differs from the number of teeth in the output drive gear of the other motor, whereby both motors may be operated at the same rotational speed to permit accurately controllable relative movement at a relatively slow speed, and one motor may be de-energized to achieve high speed operation.

18 Claims, 7 Drawing Figures

DRIVE APPARATUS FOR AN INDUSTRIAL ROBOT

The present invention relates to a drive apparatus for an industrial robot, and which is characterized by accurately controllable movement of an element at slow speed, and by the ability to efficiently function as a speed control transmission.

Industrial robots have been developed in recent years as a replacement for human labor in performing repetitive, hazardous or tiring work. Such robots typically have the capability of moving through six revolute axes to manipulate objects, parts, or tools through variable programmed motions for the performance of a variety of tasks. Reprogrammable robots are also available which incorporate a computer and microprocessor whereby the robot may be taught to move from point to point using a portable teaching box or the like.

In most conventional robots, each of the movable elements is moved about its axis of movement by means of an electrical DC servo-motor which acts through a conventional gear train. However, in view of the inherent limitations on the rotational control of such motors, the accuracy of the movement of the element is correspondingly limited, and a high degree of control over the positioning of the element cannot be achieved. Also, conventional DC servo motors are not readily controllable for smooth acceleration and deceleration.

It has also been proposed to utilize a drive system in an industrial robot which includes a pair of motors acting through a differential gear train and so that one movement is obtained by the sum of the motor outputs and another movement is obtained by their difference, note for example the U.S. patents to Glachet et al, No. 3,817,403 and Flatau, No. 4,062,455. However, it is not believed that these systems are capable of providing the high degree of positional control demanded in many modern industrial processes, nor are they easily controllable to provide a full range of acceleration and deceleration curves for the movable element.

It is accordingly an object of the present invention to provide a drive apparatus for an industrial robot which effectively overcomes the above noted limitations of the present commercially available and known systems.

It is a more particular object of the present invention to provide an industrial robot which is adapted to achieve highly accurate positional control of the movable elements of the robot.

It is a further object of the present invention to provide a drive apparatus for an industrial robot of the described type which is readily controllable to provide smooth acceleration or deceleration, and which is able to closely conform to a desired acceleration or deceleration curve.

It is also an object of the present invention to provide an industrial robot of the described type wherein a number of the movable elements are controlled by individual drive units which are substantially identical, to thereby achieve substantial standardization of parts and facilitate the interchangeability thereof.

Still other objects of the present invention include the provision of a drive apparatus for an industrial robot which is of relatively simple design, which is compact and modular in nature, and which may be readily assembled with a minimum of required tolerances between the various components.

These other objects and advantages of the present invention are achieved in the embodiment illustrated herein by the provision of a drive apparatus for an industrial robot which comprises a pair of electrical stepping motors, with each motor having an output shaft mounting a drive gear, and drive control means for selectively operating at least one of the motors at a controllable rotational speed. The two motors act through a differential gear train, which comprises a pair of gear wheels each having two face gears, with one face gear of each wheel operatively meshing with respective ones of the motor drive gears, and a pinion gear mounted between the two gear wheels and operatively meshing with the second face gear of each gear wheel.

The use of electrical stepping motors is preferred and greatly facilitates the control of the robot movement, since the rotational position and speed of such motors may be accurately controlled by the delivery of a specified number and frequency of discrete electrical pulses. Also, the rotational position of such motors may be readily verified by the counting of the pulses delivered to each motor by means of a position verification encoder associated with each motor. Still further, the digital nature of such motors renders them easily controllable by a conventional digital computer.

Preferably, the number of teeth on the drive gear of one stepping motor is diffferent by one from the number of teeth on the drive gear of the other motor. Thus, in the slow, accurately controllable mode of operation, the two motors may be operated at the same speed, and thus operable from the same electrical pulse generator, to rotate the movable element in a slow and closely controlled manner. In the high speed mode, one motor may be de-energized so that the other motor is able to act through the differential gear train to rotate the movable element in close conformance to a programmed acceleration or deceleration curve and speed.

It is also preferred that each of the two face gears on each of the gear wheels be in the form of a circular rack, i.e., the faces of the gear teeth on each face gear are coplanar and lie in a plane perpendicular to the axis of relative rotation. This configuration permits the drive gears of the two drive motors to be aligned and assembled with the gear wheels by movement along a single direction, to thereby facilitate the assembly of the components.

Some of the objects and having been stated, other objects will appear as the description proceeds, when taken in connection with the accompanying drawings in which FIG. 1 is a perspective view of an industrial robot which embodies the present invention;

FIG. 3 is a fragmentary top plan view, partly sectioned, of the robot of FIG. 1, and which also schematically illustrates a portion of the drive control system;

Figure 1:
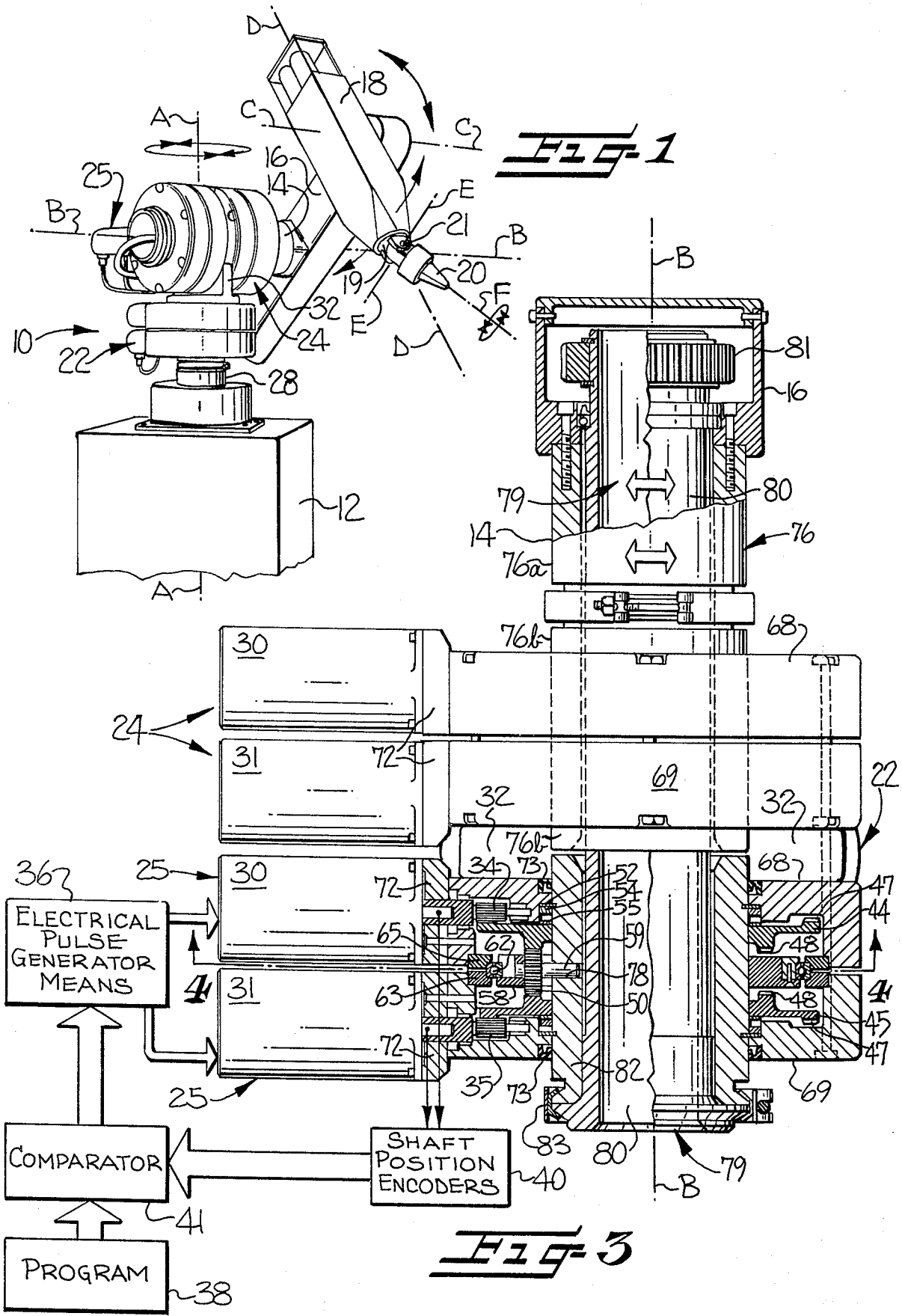

Referring more particularly to the drawings, an industrial robot embodying the features of the present invention is illustrated generally at 10 in FIG. 1. The robot is adapted for moving through six axes of revolution, and comprises a base or vertical support stand 12 having a horizontal waist 14 which is pivotally mounted for movement about the vertical axis A. An inner arm 16 is pivotally mounted to the outer end of the waist 14 for movement about the horizontal axis B, and an outer arm 18 is pivotally mounted to the outer end of the inner arm for movement about the horizontal axis C. A wrist member 19 is rotatably mounted at the end of the outer arm for rotation about the axis D, and a tong 20 is connected to the wrist by means of a pin 21 to permit movement about the axis E. Further, the tong 20 is rotatable about the rotational axis F.

Figure 2:
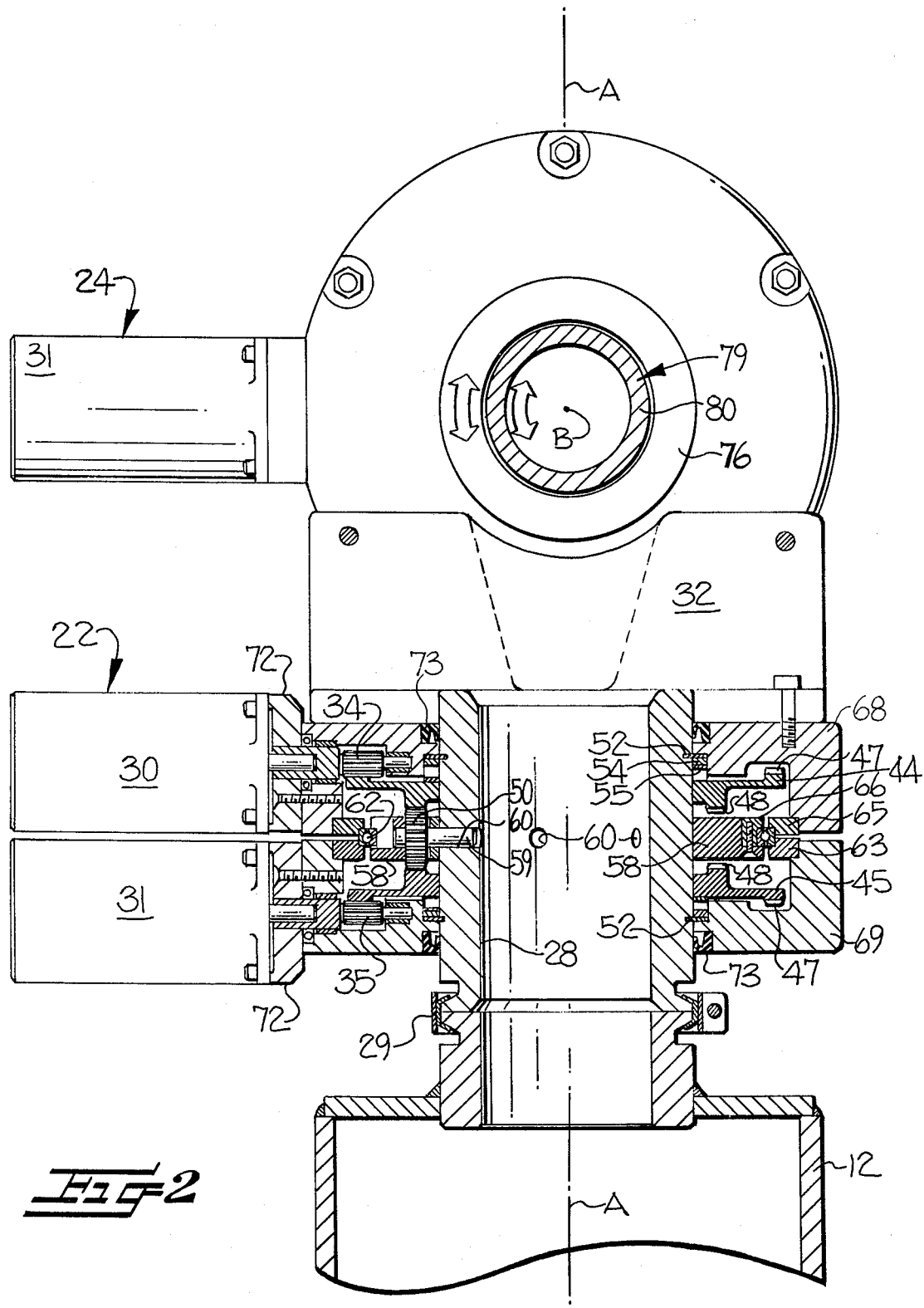
FIG. 2 is a fragmentary side elevation view, partly sectioned, of the robot of FIG. 1.
Figure 4:
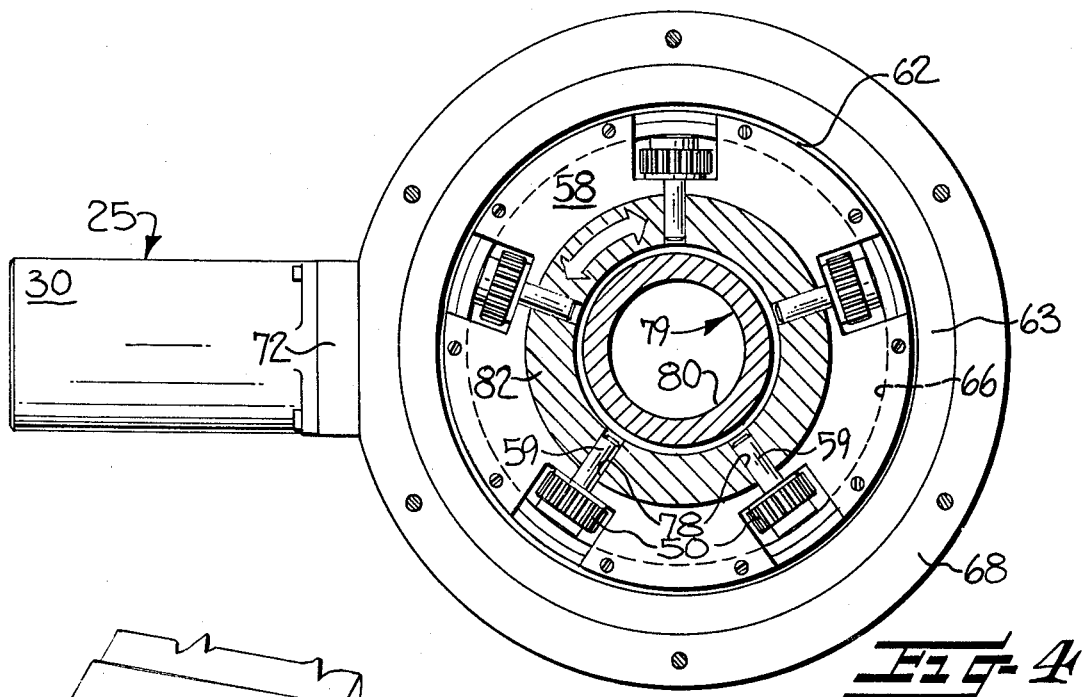
FIG. 4 is a sectional plan view taken substantially along the line 4—4 of FIG. 3.

FIG. 2 illustrates the drive unit 22 by which movement of the waist 14 relative to the stand about the axis A may be effected. In this regard, it will be noted that other like drive units 24, 25 are utilized to power each of two other movements of the robot. As best seen in FIG. 3, the unit 24 is utilized for the movement of the inner arm 16 with respect to the waist about the axis B, and the unit 25 is utilized for the movement of the outer arm with respect to the inner arm about the axis C. As will be appreciated, this standardization of drive units greatly simplifies the design, construction, and repair of the overall apparatus, and promotes standardization of parts. The drive units for the other movements of the illustrated robot may be generally conventional, and do not form a part of the present invention.

The waist drive unit 22 is mounted for rotation about the cylindrical post 28 which is fixed to the support stand 12 by a suitable connector 29, with the post 28 defining the vertical axis A. The unit 22 comprises a pair of electrical stepping motors 30, 31 fixedly mounted to a bracket 32 which in turn forms the frame of the waist 14. Electrical stepping motors are per se well-known in the art and are operated by discrete electrical pulses which are fed in a sequential manner from a suitable switching control system. For every pulse fed to the motor, the motor rotates a fixed angle, typically 1.8 degrees. Thus, the number of pulses fed to the motor determines the rotational angle the motor will make. In order to obtain verification that the motor has in fact rotated, it is also common to mount a shaft encoder on the output shaft of the motor, which produces a verification signal upon each step having been taken.

In the present invention, the two stepping motors 30, 31 of the unit 22 are mounted to the bracket 32, with the output shafts of the two motors being disposed parallel to each other and extending in a direction which perpendicularly intersects the axis A. The two motors 30, 31 each include a drive gear 34, 35 mounted at the end of the respective shaft. The two drive gears 34, 35 preferably have an unequal number of teeth, with the number typically differing by one.

The drive control for the two motors 30, 31 of the unit 22 conforms to that illustrated schematically in FIG. 3, and includes a suitable switching apparatus or pulse generator 36, which in the illustrated embodiment is common for both motors of a drive unit. In other embodiments, a separate generator may be provided for each motor. The operation of the generator 36 is controlled by a program 38 of a digital computer or the like. Also, each motor preferably includes a shaft encoder 40, which feeds a verification signal to a comparator 41 upon each rotational step of the associated motor. Should the comparator detect a failure of rotation, a suitable corrective signal is fed to the generator. By this arrangement, a highly reliable positional movement in accordance with the desired program may be assured.

The two motors 30, 31 of the unit 22 are operatively interconnected to the vertical post 28 by means of a differential gear train. More particularly, the differential gear train includes a pair of like, oppositely oriented gear wheels 44, 45, with each gear wheel being rotatably disposed coaxially about the post 28 for rotation about the axis A. Each gear wheel 44, 45 includes two oppositely facing face gears 47, 48, with the outer face gear 47 of each wheel operatively meshing with respective ones of the drive gears 34, 35 and so that each motor is adapted to rotate its associated gear wheel about the axis A. A total of five pinion gears 50 are mounted between the two gear wheels 44, 45, and so as to operatively mesh with the inner face gear 48 of each gear wheel. As illustrated, the two face gears 47, 48 on each gear wheel are each in the form of a circular rack, i.e. the faces of the gear teeth are coplaner and lie in a plane perpendicular to the axis A. This configuration facilitates the alignment and assembly of the differential gear train, in that the gear wheels 44, 45 and drive gears 34, 35 are relatively movable along only a single vertical direction, rather than a plurality of directions as would be required by conventional bevel gears.

Figure 7:
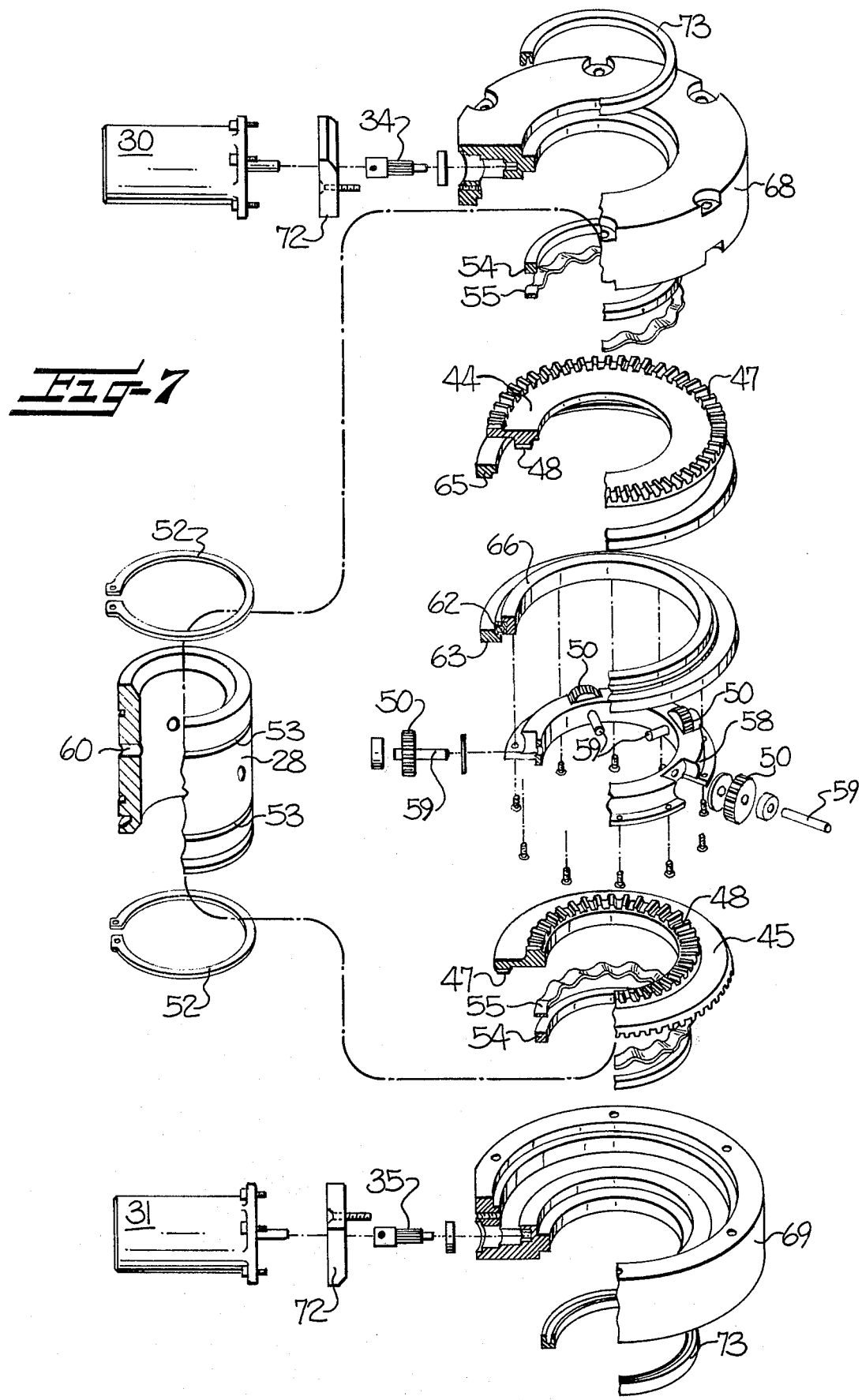
FIG. 7 is an exploded perspective view of one of the drive units of the illustrated robot.

As best seen in FIGS. 2 and 7, the two gear wheels 44, 45 are rotatably mounted on the post 28 between a pair of snap rings 52, which are held in the respective grooves 53 on the post. A spacer 54 and wave spring 55 are disposed between each snap ring and adjacent gear wheel, so that the gear wheels are free to rotate and are axially biased toward each other and into operative meshing engagement with the five pinion gears.

The five pinion gears 50 are assembled to a planet carrier 58, by means of respective pinion shafts 59 which extend perpendicularly to the axis A. The inner end of each shaft is received in a mating radial opening 60 in the post 28. The planet carrier 58 also supports a bearing 62, in cooperation with a bearing retainer ring 63 and the two mating support rings 65, 66. Upper and lower gear housings 68, 69 serve to enclose the gears, with the two housings being fixed to each other and to the bracket 32 by suitable bolts (not shown). A motor mounting plate 72 is utilized to secure each stepping motor to an associated housing, and a resilient sealing ring 73 is disposed between each housing 68, 69 and the post 28 adjacent the outer face of the housing.

To rotate the waist 14 in an accurately controllable, slow speed mode, both motors 30, 31 are operated at a corresponding speed and in a common direction by the pulses received from the generator 36. Since the gear wheels 44, 45 are oriented to face in opposite directions, with the motors on respective opposite sides, the gear wheels will rotate about the axis A in opposite directions. In view of the different number of teeth on the drive gears 34, 35, the pinions 50, which are locked to the vertical post 28 by their mounting shafts 59, will cause the motors 30, 31, bracket 32, and the waist 14 to all slowly rotate about the axis A.

The waist 14 may be rotated at a readily controllable high speed by either terminating operation of one motor or pulsing it at a fixed rate. The other motor may then be pulsed in a manner controlled by the computer program 38 to provide a desired acceleration, deceleration, or constant speed to the waist. Thus, only one motor needs to be variably controlled to provide the desired movement.

Figure 5:
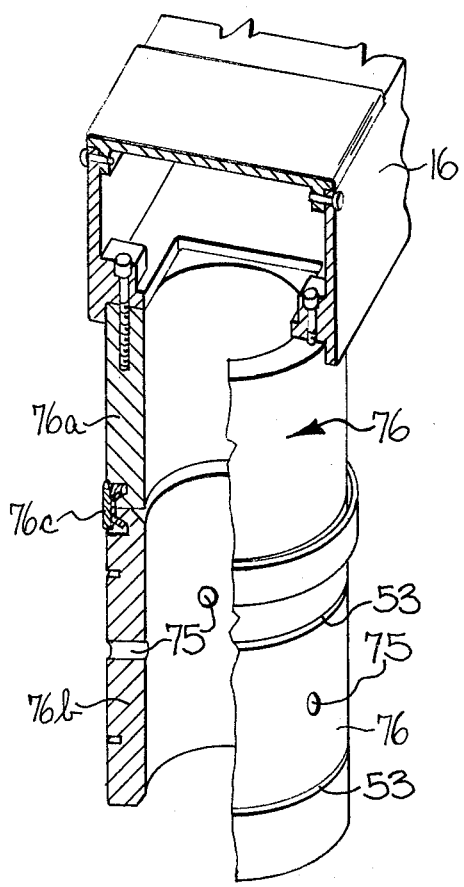
FIG. 5 is a perspective view of the inner arm drive shaft of the illustrated robot.
Figure 6:
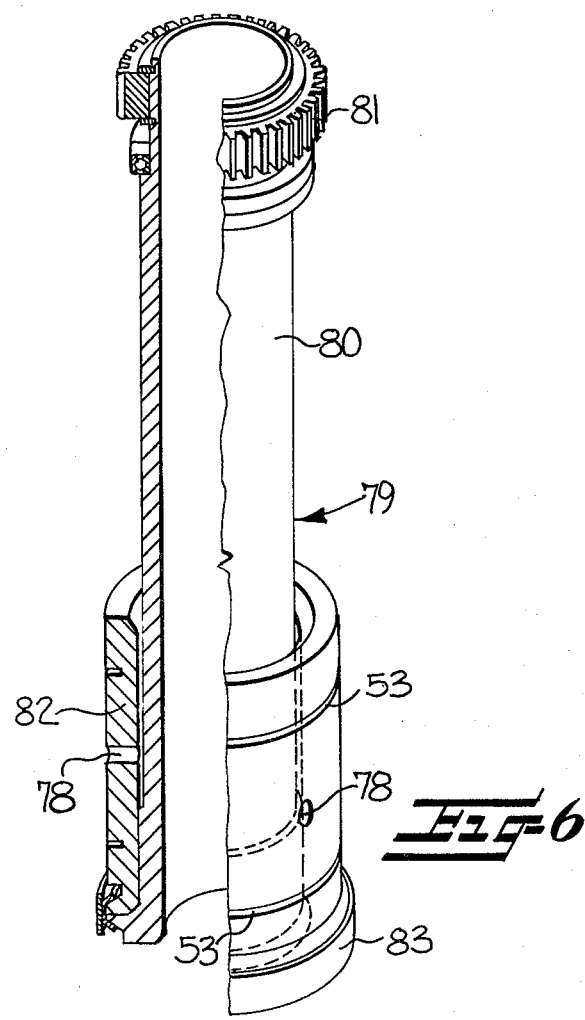
FIG. 6 is a perspective view of the outer arm drive shaft of the robot.

The motors and differential gear train for the drive unit 24 of the inner arm, and for the drive unit 25 of the outer arm, will be seen to be substantially identical to the above described construction. The motors and housings 68, 69 of these two drive units are fixed to the bracket 32. In the case of the inner arm drive unit 24, the shafts 59 of the pinions 50 are disposed in openings 75 in the tubular drive shaft 76 (FIG. 5). The shaft 76 is composed of two segments 76a and 76b, which are interconnected by a suitable connector 76c. Further, the shaft 76 is directly connected to the inner arm 16, and which is mounted to the bracket 32 for rotation about the axis B. In the case of the outer arm drive unit 25, the shafts 59 of the pinions 50 are disposed in openings 78 in the inner drive shaft 79 (FIG. 6). More particularly, the drive shaft 79 includes an inner sleeve portion 80 which extends coaxially through the drive shaft 76 and mounts a suitable gear 81 at the remote free end thereof. In addition, the drive shaft 79 includes a second portion 82 which is disposed axially outside of the drive shaft 76 and has an outer diameter generally corresponding to that of the shaft 76. The inner sleeve portion 80 is interconnected to the second portion 82 by a suitable connector 83. Also, the gear 81 of the drive shaft 79 is operatively connected to control movement of the outer arm 18 in a conventional manner which is not illustrated. The operation of each of the drive units 24, 25 will be seen to be substantially identical to that described above with respect to the waist drive unit 22.

In the drawings and specification there has been set forth a preferred embodiment of the invention, and although specific terms are employed, they are used in a generic and descriptive sense only and not for purposes of limitation.

That which is claimed is:

1. An industrial robot comprising at least one element which is operatively connected to a second element for relative movement about an axis, and including a drive apparatus for effecting relative movement of the two elements about said axis and which is characterized by the ability to permit accurately controllable movement of the two elements relative to each other, and by the ability to function as a readily controllable transmission, said drive apparatus comprising:
    a pair of electrical stepping motors fixedly mounted to one of said elements, with each motor having an output shaft mounting a drive gear,
    drive control means for selectively operating each of said motors, and operating at least one of said motors at a variable rotational speed,
    a pair of gear wheels, with each gear wheel disposed coaxially about said axis and having two face gears, with one face gear of each wheel operatively meshing with respective ones of said drive gears and so that each motor is adapted to rotate its associated gear wheel about said axis,
    pinion gear means mounted to the other of said elements, with said pinion gear means being positioned between and operatively meshing with the second face gear of each of said gear wheels,
    whereby accurately controllable relative movement of the two elements may be achieved by operating the motors at speeds which produce slightly different rotational speeds in the two gear wheels, and the speed of relative movement between the two elements may be varied by varying the speed of said one controllable motor.

2. The industrial robot as defined in claim 1 wherein the total number of gear teeth on one drive gear and its associated gear wheel differs from the total number of gear teeth on the other drive gear and its associated gear wheel, whereby operation of the two drive motors at a common rotational speed produces a relatively slow relative movement of the two elements about said axis to permit highly accurate positional control.

3. The industrial robot as defined in claim 2 wherein the number of teeth on each of the two face gears of one gear wheel is equal to the number of teeth on the corresponding face gear of the other gear wheel, and the number of teeth on one drive gear is different from the number of teeth on the other drive gear.

4. The industrial robot as defined in any one of claims 1-3 wherein each of the two face gears on each of said gear wheels is in the form of a circular rack.

5. The industrial robot as defined in any one of claims 1-3 wherein said drive control means comprises electrical pulse generator means, and program means for controlling the output of said pulse generator means.

6. The industrial robot as defined in claim 5 wherein said drive control means further comprises position verification means for each of said stepping motors, and means for comparing signals from each of said position verification means with signals from said program means.

7. An industrial robot comprising at least one element which is operatively connected to a second element for relative movement about an axis, and including a drive apparatus for effecting relative movement of the two elements about said axis and which is characterized by the ability to permit accurately controllable movement of the two elements relative to each other, and by the further ability to function as a readily controllable transmission, said drive apparatus comprising:
    a pair of electrical drive motors fixedly mounted to one of said elements, with each motor having an output shaft mounting a drive gear,
    drive control means for selectively operating each of said motors, and operating at least one of said motors at a variable rotational speed,
    a pair of gear wheels, with each gear wheel disposed coaxially about said axis and having two face gears, with one face gear of each wheel operatively meshing with respective ones of said drive gears and so that each drive motor is adapted to rotate its associated gear wheel about said axis, and with the total number of gear teeth on one drive gear and its associated gear wheel differing from the total number of gear teeth on the other drive gear and its associated gear wheel,
    pinion gear means mounted to the other of said elements, with said pinion gear means being positioned between and operatively meshing with the second face gear of each of said gear wheels,
    whereby accurately controllable relative movement of the two elements may be achieved by operating the motors at a common rotational speed to produce slightly different rotational speeds in the two gear wheels resulting from the different numbers of gear teeth, and the speed of relative movement between the two elements may be varied by varying the speed of said one controllable motor.

8. The industrial robot as defined in claim 7 wherein said output shafts of said pair of electrical motors are disposed parallel to each other and extend in a direction perpendicular to said axis of relative movement.

9. The industrial robot as defined in claim 8 further comprising spring biasing means for resiliently urging said pair of gear wheels axially toward each other and into operative meshing engagement with said pinion gear means.

10. An industrial robot comprising at least two arms which are operatively connected to each other and to a frame member for movement about two separate axes, and comprising a first tubular drive shaft rotatably mounted to said frame member to define a rotational axis which is fixed with respect to said frame member, a first arm fixed to said first drive shaft, a second drive shaft rotatably mounted to said frame member for rotation about said rotational axis, and with a first axial portion of said second drive shaft being coaxially disposed within said first drive shaft and a second axial portion of said second drive shaft being coaxially disposed outside of said first drive shaft, a second arm pivotally connected to said first arm, and means operatively interconnecting said second drive shaft and said second arm whereby rotation of said second drive shaft causes said second arm to pivot with respect to said first arm, a first drive unit operatively mounted to said frame member and said first drive shaft for rotating said first drive shaft about said rotational axis, a second drive unit operatively mounted to said frame member and that portion of said second drive shaft which is disposed outside of said first drive shaft, for rotating said second drive shaft about said rotational axis, said first and second drive units having like components which comprise (a) a pair of electrical drive motors fixedly mounted to said frame member, with each motor having an output shaft mounting a drive gear, (b) drive control means for selectively operating each of said motors, and operating at least one of said motors at a variable rotational speed, (c) a pair of gear wheels, with each gear wheel disposed coaxially about said rotational axis and having two face gears, with one face gear of each wheel operatively meshing with respective ones of said drive gears and so that each drive motor is adapted to rotate its associated gear wheel about said axis, and (d) pinion gear means operatively connected to the associated drive shaft and positioned between and operatively meshing with the second face gear of each of said gear wheels.

11. The industrial robot as defined in claim 10 wherein the total number of gear teeth on one drive gear and its associated gear wheel of each drive unit differs from the total number of gear teeth on the other drive gear and its associated gear wheel, whereby accurately controllable relative movement of the two arms may be achieved by operating the associated motors at a common rotational speed to produce slightly different rotational speeds in the two gear wheels resulting from the different numbers of gear teeth, and the speed of relative movement may be varied by varying the speed of said one controllable motor.

12. The industrial robot as defined in claim 11 wherein said drive motors of each drive unit are disposed parallel to each other with the output shafts extending perpendicular to said rotational axis, and wherein all of said drive motors comprise electrical stepping motors.

13. The industrial robot as defined in any one of claims 10–12 wherein the outer diameter of said second axial portion of said second drive shaft substantially corresponds to the outer diameter of said first drive shaft.

14. An industrial robot having at least three separately controlled axes of movement, and characterized by the drives for two of the movements having coaxial components, and comprising a support member (12), a first drive unit (22) having a base component (28) fixedly mounted to said support member, and a secondary component (68,69) rotatably mounted with respect to said base component to define a first axis (A), and drive means (30,31) for relatively rotating said base component and secondary component about said first axis, a second drive unit (25) having a base component (82), and a secondary component (68,69) rotatably mounted with respect to its base component to define a second axis (B), means fixedly mounting said secondary component of said second drive unit to said secondary component of said first drive unit such that the second axis is non parallel to said first axis, output means (79) fixed to said base component of said second drive unit and aligned coaxially with said second axis, and drive means for relatively rotating said base component and secondary component of said second drive unit about said second axis, a third drive unit (24) having a base component (76b), and a secondary component (68,69) rotatably mounted with respect to its base component to define a further axis, means fixedly mounting said secondary component of said third drive unit to the secondary component of said first drive unit such that said further axis is coaxial with said second axis (B), output means (76a) fixed to said base component of said third drive unit and aligned coaxially with said second axis, and drive means for relatively rotating said base component and secondary component of said third drive unit about said second axis.

15. The industrial robot as defined in claim 14 wherein said first and second axes perpendicularly intersect.

16. The industrial robot as defined in claim 15 wherein said base component (76b) and output means (76a) of said third drive unit are tubular, and said output means (79) of said second drive unit includes a shaft (80) extending coaxially through said base component and output means of said third drive unit.

17. The industrial robot as defined in claim 16 wherein said robot further comprises an inner arm (16), means interconnecting said inner arm to said output means of said third drive unit, an outer arm (18), means pivotally connecting said outer arm to said inner arm for relative rotation about a third axis (C) disposed parallel to and laterally spaced from said second axis, and transmission means (81) operatively connecting said output means of said second drive unit to said outer arm, whereby said inner arm may be pivoted about said second axis by said third drive unit, and said outer arm may be pivoted about said third axis by said second drive unit.

18. The industrial robot as defined in claim 17 wherein said drive means of each of said first, second, and third drive units comprises at least one electrical stepping motor.

* * * * *